UNITED STATES PATENT OFFICE.

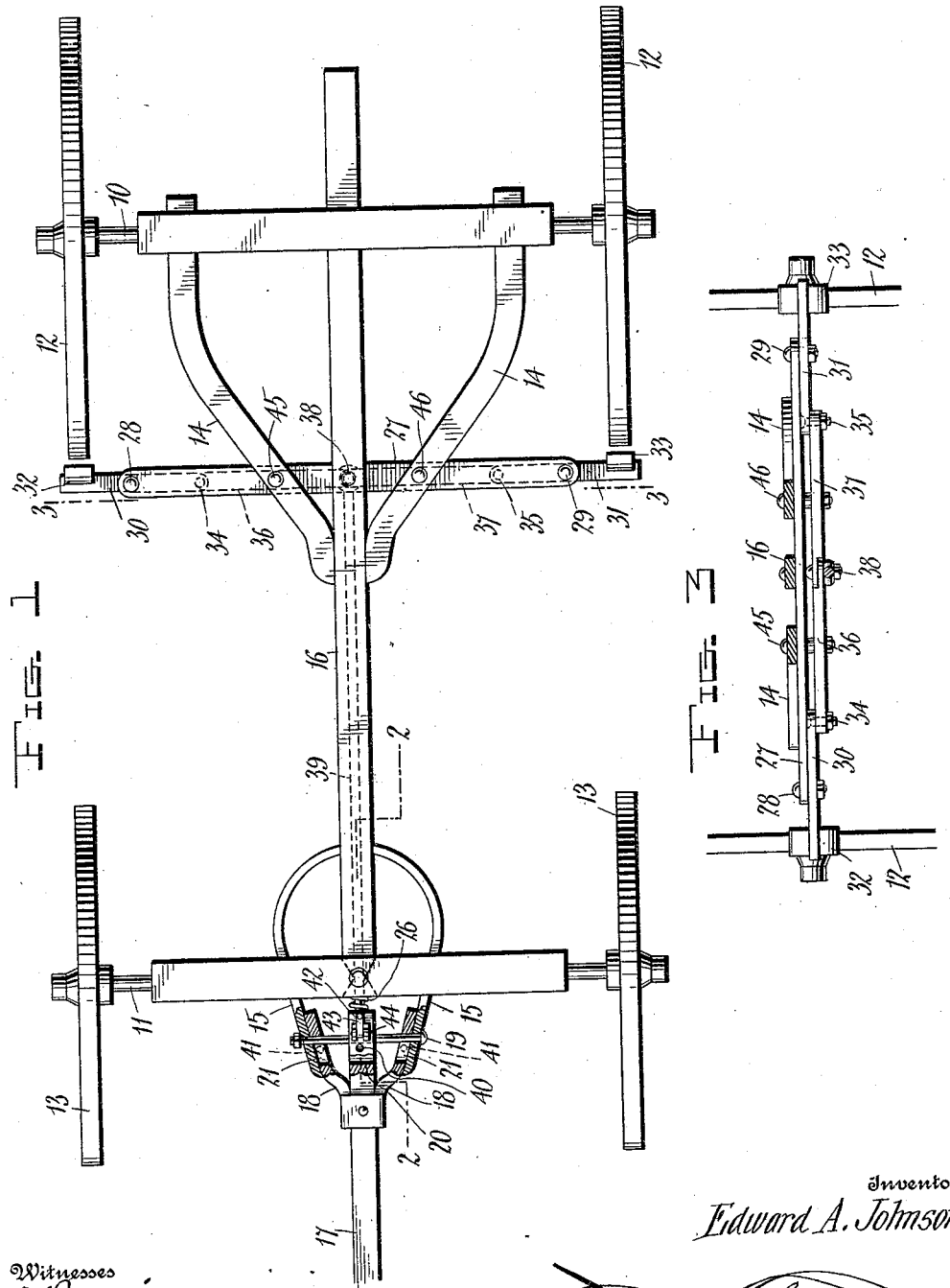

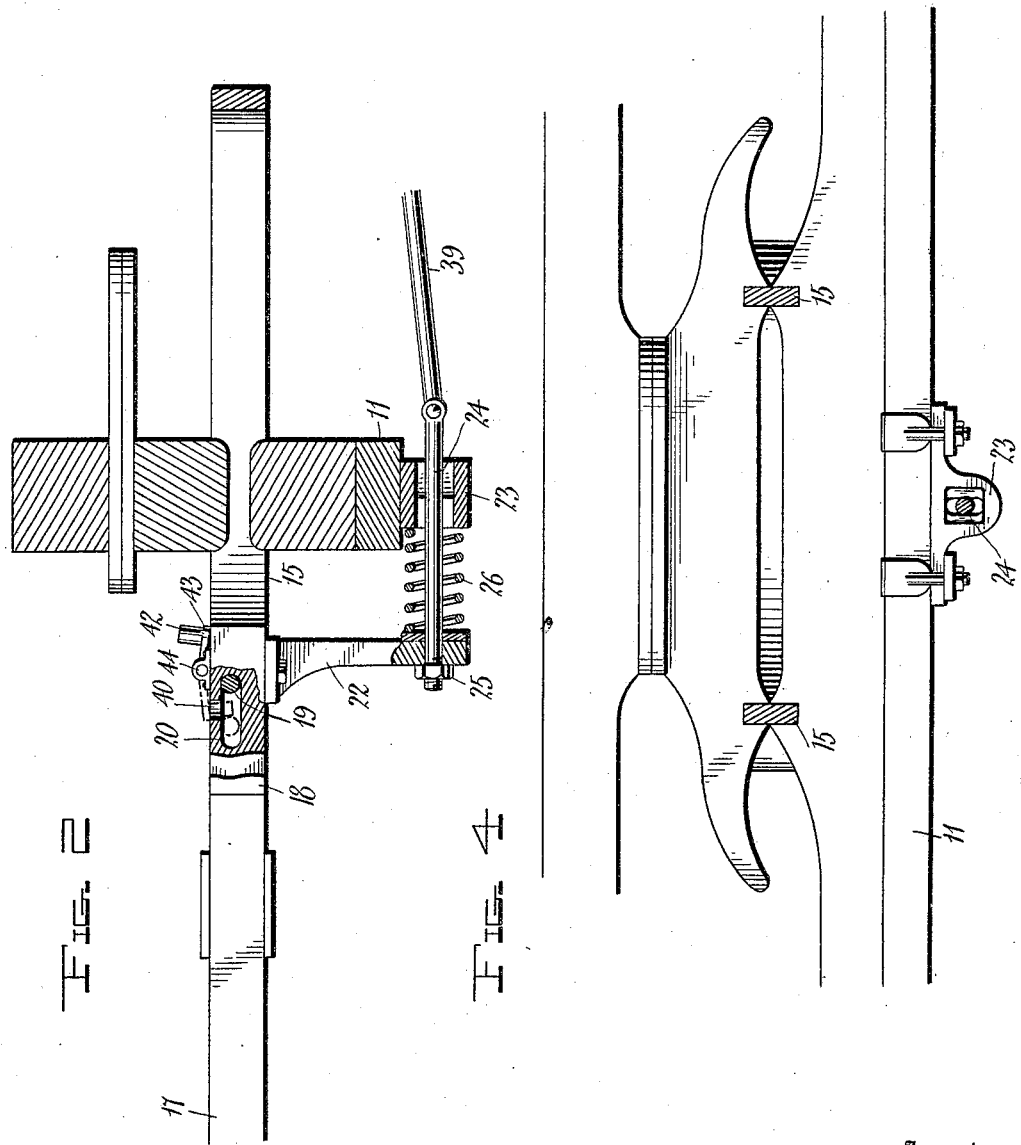

EDWARD A. JOHNSON, OF LOVELL, OKLAHOMA.

WAGON-BRAKE.

938,241.  Specification of Letters Patent.  Patented Oct. 26, 1909.

Application filed November 18, 1908.  Serial No. 463,196.

*To all whom it may concern:*

Be it known that I, EDWARD A. JOHNSON, a citizen of the United States, residing at Lovell, in the county of Logan, State of Oklahoma, have invented certain new and useful Improvements in Wagon-Brakes; and I do hereby declare the following to be a full, clear, and exact description of the invention, such as will enable others skilled in the art to which it appertains to make and use the same.

This invention relates to automatic wagon brakes, of the class wherein the brake is applied by the backing of the team or by the forward movement of the load when going down an incline, and has for one of its objects to simplify and improve the construction and increase the efficiency and utility of devices of this character.

With this and other objects in view, the invention consists in certain novel features of construction as hereafter shown and described and then specifically pointed out in the claims, and in the drawings illustrative of the preferred embodiment of the invention, Figure 1 is a plan view of the running gear of a wagon with the improvement applied. Fig. 2 is a sectional view enlarged, on the line 2—2 of Fig. 1. Fig. 3 is a section on the line 3—3 of Fig. 1, partly in section, of the parts shown in Fig. 1. Fig. 4 is a front view enlarged, of a portion of the forward axle, with the guide keeper attached.

The improved device is designed more particularly for farm wagons and like heavy draft vehicles which are used over rough roads or in hilly portions of the country, and for the purpose of illustration is shown applied to a conventional form of running gear of a vehicle of this class in which 10 represents the rear axle, 11 the forward axle, 12 the rear wheels, 13 the forward wheels, 14 the rear axle hounds, 15 the forward axle hounds, 16 the reach, 17 the tongue and 18 the tongue hounds, the latter arranged between the forward converging portions of the forward axle hounds 15.

The transverse rod 19 by which the tongue hounds are connected between the forward axle hounds extends through the members 15—17—18 in the ordinary manner, but in the improved construction the members 17—18 are slotted longitudinally, as shown at 20—21 to permit the rear movement of the tongue and its hounds, the object to be hereafter explained.

The forward portion of the forward axle hounds 15 converge, while the tongue hounds 18 are correspondingly converged and closely engaged against the inner face of the axle hounds when in their forward position, so that the forward strains are partly borne by the two sets of hound members, and the bolt 19 thereby relieved largely from strain during the forward movement of the vehicle, while at the same time by reason of the longitudinal slots the tongue and its hounds are free to move rearwardly upon the rod 19 to an extent equal to the length of the slots, the object to be hereafter explained.

Depending from the rear end of the tongue 17 is an arm 22, and connected beneath the axle 11 is a guide member 23, a rod 24 being slidably disposed through the guide member and connected at 25 to the lower end of the member 22. A spring 26 is located between the members 22—23 and operates to maintain the member 22 and the tongue 17 and its hounds yieldably in their forward positions, or with the rod 19 at the rear ends of the slot 20—21. The spring 26 and arm 22 also coact to maintain the tongue 17 yieldably in its upward or operative position, and thus release the necks of the horses from the weight of the tongue. The spring and arm thus serve as an effectual tongue support. Connected across the rear hounds 14 is a bar 27 and pivoted at 28—29 upon this bar are brake beams 30—31 carrying shoes 32—33 adapted to engage against the rear wheels 12.

Pivoted at 34—35 to the inner ends of the beams 30—31 are two levers 36—37 and pivoted at 45—46 to the member 27, and also pivotally united at 38 at their confronting ends. Extending rearwardly from the rod 24 is a push rod 39 pivoted at its ends respectively to the rod 24 and to the pivot point 38 of the levers 36—37. By this arrangement it will be obvious that when the tongue 17 and its hounds 18 are moved rearwardly the push rod 39 will be moved rearwardly to a corresponding extent through the action of the depending member 22 and the rod 24 and thus set the brake shoes 32—33 against the wheels 12, the rear movement of the tongue operating against the spring 26, and when the rearward pressure is removed from the tongue, the spring will restore the tongue to its former forward position and thus likewise release the brake shoes from the rear wheels.

With a vehicle equipped with these improved devices it will be obvious that so long as the draft appliances are operating to draw the vehicle forward, as for instance when moving up hill or on level ground, the brake device will be maintained in its inoperative position, or disconnected from the rear wheels. In event however, of the vehicle entering upon a downward incline of sufficient extent to cause the vehicle to move faster than the draft animals, or in event of the driver holding back the draft animals, the tongue and its hounds will be caused to move rearwardly and thus apply the brake, the pressure of the brake being controlled automatically by the amount of the rear pressure applied by the operation of a load, as will be obvious.

Formed through the upper portions of the tongue 17 and the hounds 18 closely in advance of the rod 19 when the latter is in its rear position, are vertical apertures, one of which is represented at 40, the apertures thus communicating with the slots 20—21, the apertures designed to receive stop bolts 42 to lock the rod 19 in its rear position and thus permit the operation of the brake mechanism by preventing any rear movement of the tongue and its hounds. Thus when it is desired to back the team for any purpose without requiring the action of the brakes, the bolts will be applied. By this means the brake mechanism is rendered inoperative.

The bolts 42 will each preferably be connected to a short arm 43 hinged at 44 respectively to the tongue and the hounds 18, so that the bolts will always be in convenient position for use when required.

The device is simple in construction, can be inexpensively manufactured, and applied to vehicles of various forms and constructions without material structural changes in the mechanism.

What is claimed, is:—

In a device of the class described comprising the running gear of a vehicle including the forward axle hounds having their side members converging forwardly, a tie rod extending transversely through said axle hounds, a draft tongue having a longitudinal slot slidably engaging over said rod, tongue hounds connected to said tongue and bearing between the axle hounds, said tongue hounds converging forwardly and bearing against the inner faces of the axle hounds, having transverse slots corresponding to the slot of the tongue and slidably engaging said rod, a standard depending from the tongue, a brake beam having brake shoes adapted to engage against the rear wheels of the running gear, a push rod connected between said depending standard and the brake beam, a guide member adapted to be connected to the forward axle of the running gear and through which the push rod passes, and a spring arranged to maintain the tongue and its hounds yieldably in their forward position.

In testimony whereof, I affix my signature, in presence of two witnesses.

EDWARD A. JOHNSON.

Witnesses:
G. I. POLLARD,
H. J. JOHNSON.